United States Patent [19]
Tahiliani et al.

[11] 3,927,246
[45] Dec. 16, 1975

[54] THREE-PHASE CABLE TERMINATION FOR METAL ENCLOSED COMPRESSED GAS-INSULATED SUBSTATION

[75] Inventors: Vasu H. Tahiliani, New Stanton; Howard W. Graybill, Greensburg, both of Pa.

[73] Assignee: I-T-E Imperial Corporation, Spring House, Pa.

[22] Filed: Aug. 26, 1974

[21] Appl. No.: 500,407

[52] U.S. Cl. .............................. 174/19; 174/73 R
[51] Int. Cl.[2] ...................................... H02G 15/22
[58] Field of Search ............ 174/19, 20, 18, 15 BA, 174/28, 73 R; 200/148 R

[56] References Cited
UNITED STATES PATENTS

| | | | |
|---|---|---|---|
| 2,857,453 | 10/1958 | Laird | 174/19 X |
| 3,129,310 | 4/1964 | Frakes et al. | 174/18 X |
| 3,217,091 | 11/1965 | Walker | 174/19 X |
| 3,233,032 | 2/1966 | Crowdes | 174/19 X |
| 3,325,583 | 6/1967 | Frowein | 174/20 |
| 3,538,281 | 11/1970 | Leeds et al. | 174/18 X |
| 3,643,003 | 2/1972 | Graybill | 174/18 |
| 3,787,604 | 1/1974 | Guaglione | 174/18 |

*Primary Examiner*—Arthur T. Grimley
*Attorney, Agent, or Firm*—Ostrolenk, Faber, Gerb & Soffen

[57] ABSTRACT

A three-phase termination for gas (e.g. $SF_6$) insulated substations comprising an insulating gas chamber; a pothead for separation of the pipe-type cable into terminal elements below the chamber; a gas-tight seal between the pothead and the gas filled chamber; the terminal elements passing through the seal into the chamber, and tubular extensions from the chamber containing conductors connected to the terminals in the chambers. No trifurcating structure is required and the gas-filled structure is isolated from the cable structure thereby avoiding contamination of the insulating gas.

4 Claims, 5 Drawing Figures

THREE-PHASE CABLE TERMINATION FOR METAL ENCLOSED COMPRESSED GAS-INSULATED SUBSTATION

The present invention relates to high voltage substations of the compact type, in which the conductors or busses and other principal components such as circuit breakers and switches are enclosed in grounded metal enclosures and in which the live parts are insulated from the grounded enclosures with a compressed insulating gas such as sulphur hexafluoride ($SF_6$).

In substations of this type that have been built to date, connection between the metal enclosed switchgear and the pipe-type power cables have been made by potheads similar to the conventional pothead design except modified for $SF_6$ substation installation. These potheads have been of single phase design which require assemblies, such as trifurcators to segregate the three-phase cable enclosure near the cable termination. Conventional pipe-type power cable to air termination required this trifurcation since it was essential to maintain the dielectric clearances in air. However, these clearances are no longer required since this the specific structure of the present invention involves termination into a high dielectric medium such as $SF_6$ gas.

It is therefore an object of this invention to provide a compact improved method of terminating pipe-type power cables into gas insulated substations.

It is a further object of this invention to provide a simplified pothead design which eliminates such items as trifurcating chambers, expensive underground enclosures that house these trifurcating chambers, and associated cable splicing work.

It is a further object of this invention to provide means of connecting the three-phase cable termination into three single-phase bus assemblies as commonly used in compact substation design.

It is still a further object of this invention to provide a compact design for terminating pipe-type power cables into a power transformer with a disconnect switch in between these two components.

The foregoing and many other objects of this invention will become apparent in the following description and drawings in which.

Figure 1:
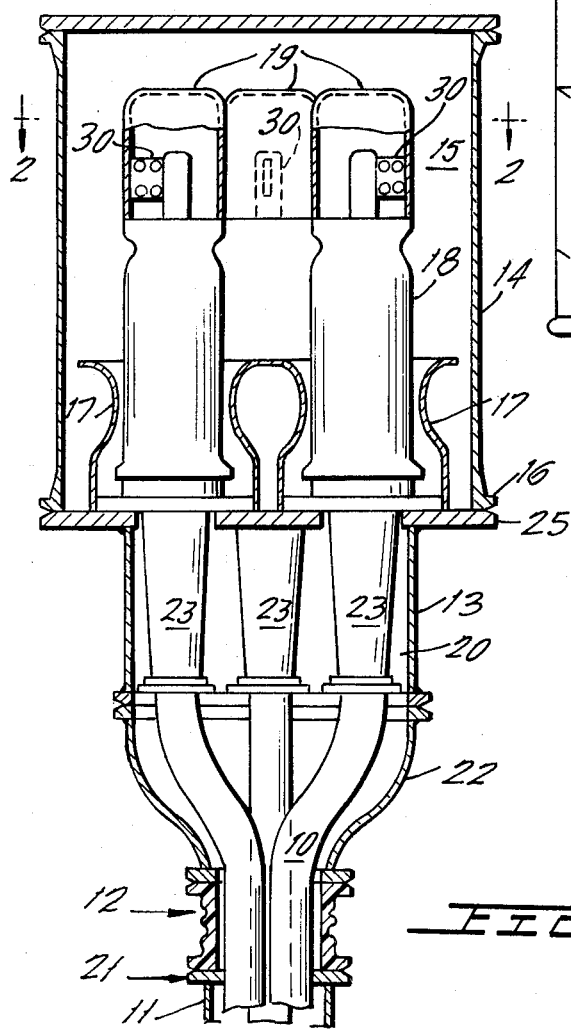
FIG. 1 is a view partly in vertical cross-section showing the basic arrangement of the present invention for termination of a three-phase pipe-type power cable.

The essential element of the present invention appears in FIG. 1 which shows the basic arrangement. The three-single phase cables 10 are enclosed in a single pipe 11 which is terminated into a base plate 21. They are hereafter to be understood as pipe-type cables. An insulating tube 12, bolted to the base plate serves to insulate the pipe 11 from the solidly grounded housing above, permitting a cathodic bias voltage on the pipe. The flared housing, 22, which is bolted on the insulator 12 allows the cables 10 to spread out. The pothead body 13 is bolted on the flared housing 22 and is similar to that used in conventional potheads, with the exception that it is large enough to accommodate three single-phase stress cones 23. The stress cones 23 form the vertical part of the end of each cable which extends into the $SF_6$ field enclosure 14. The pothead body is filled with an appropriate dielectric material which may be insulating oil, insulating gas, solid dielectric or other appropriate insulating material or spacing similar to that used in the pipe-type cable. The top flange 25 of the pothead body incorporates sealing in such a manner that the oil is sealed out from the $SF_6$ enclosure 14. The $SF_6$ enclosure 14 surrounds the energized portion of the cable termination. Since the cable extends into the $SF_6$ enclosure, the porcelain structure 18 also acts as a sealing barrier between the oil and $SF_6$ media. The ground shield 17 is so arranged that the voltage across the length of porcelain 18 is properly distributed. The corona shield 19 is so designed to keep the dielectric stress levels low enough to provide adequate dielectric strength from phase to phase as well as from phase to ground. This method of construction of the pothead assembly is somewhat similar to those presently in use with the obvious exception that all three phases will be operative at the same time.

By this means therefore, the complete assembly is much smaller resulting in savings of material as well as in required space. The arrangement does not require conventional trifurcated assemblies. The arrangement does not require additional cable splicing normally required at the trifurcator.

By this means, also the transition from a three phase cable to a pothead where the three cables are immersed in $SF_6$ insulation is provided, wherein a complete seal is also provided between the oil and the cable enclosure and the oil and the pothead, in which stress relief is provided and adequate insulation with respect to ground is also provided.

Figure 2:
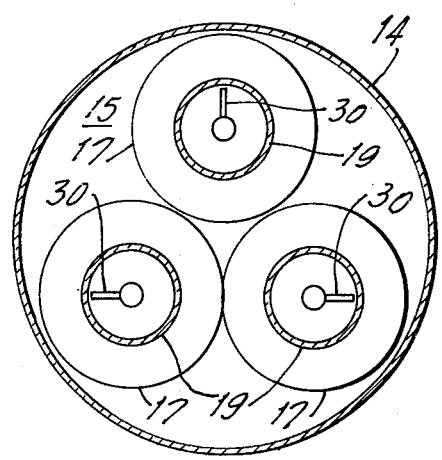
FIG. 2 is a top view partly in section taken from line 2—2 of FIG. 1 looking in the direction of the arrows.

As seen particularly in FIG. 2 the terminal lug 30 on each cable is provided for further connections as may be required.

Figure 3:
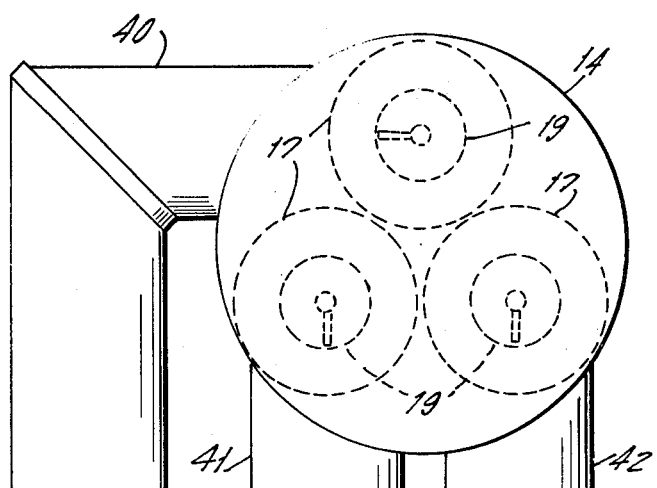
FIG. 3 is a schematic view showing the method of terminating the cables into a transformer connection.

In FIG. 3 there is shown an arrangement utilizing the novel pothead structure of FIGS. 1 and 2 for transformer termination. The metal enclosures 40, 41, and 42 extending from the pothead 14 are filled with the appropriate insulating gas such as $SF_6$. This insulating material is compatible with the gas in the pothead enclosure 14. The enclosed conductors 40a, 41a and 42a may be connected to the transformer leads, operating through appropriate connecting, switching or circuit breaker arrangements 40b, 41b and 42b as indicated. This termination arrangement is described in more detail in U.S. Pat. No. 3,819,845 issued to the assignee of the present disclosure.

Figure 4:
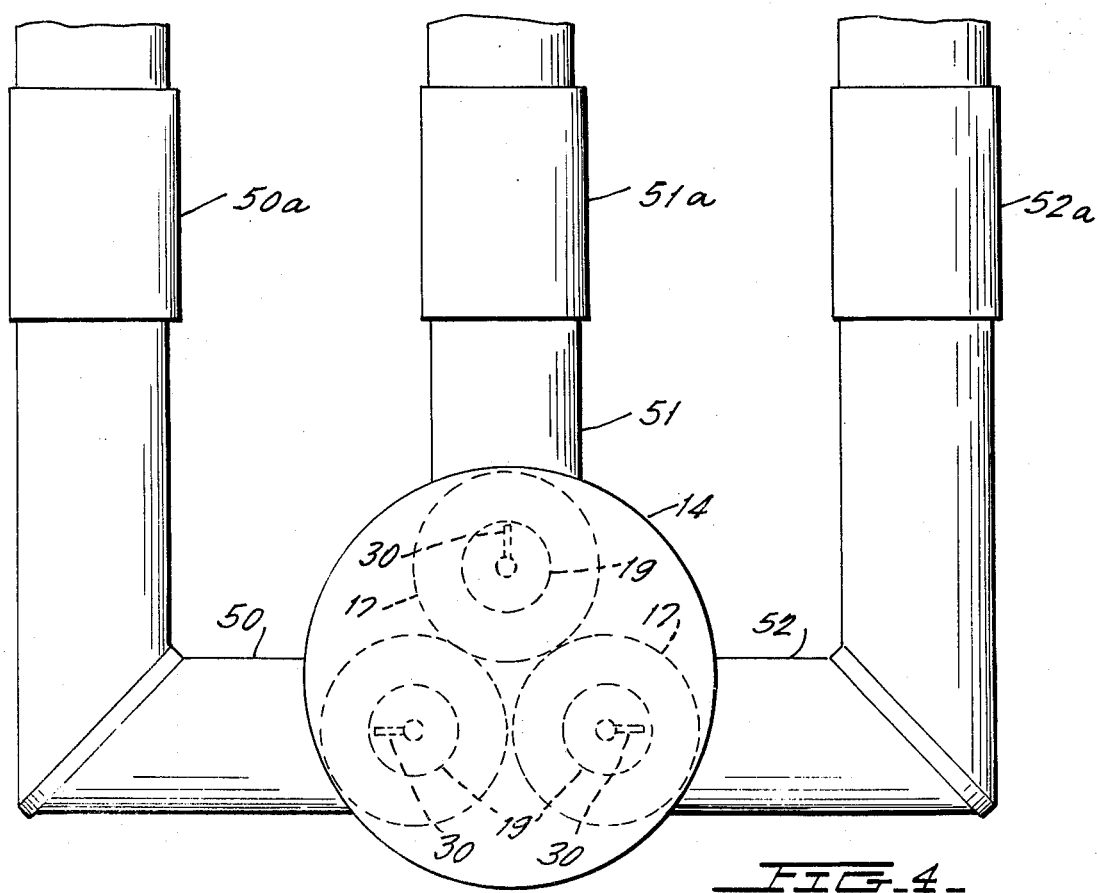
FIG. 4 is a schematic view showing the method of termination of a three-phase pothead into three single-phase isolated bus assemblies.

In FIG. 4 there is a diagrammatically shown typical arrangement of a three-phase pothead connection into three single-phase isolated bus assemblies in which the enclosures 50, 51 and 52 leading from the pothead enclosure 14 are filled with appropriate gas such as $SF_6$ and each carries a conductor, not shown, through switches or other circuit interrupting devices 50a, 51a and 52a.

Figure 5:
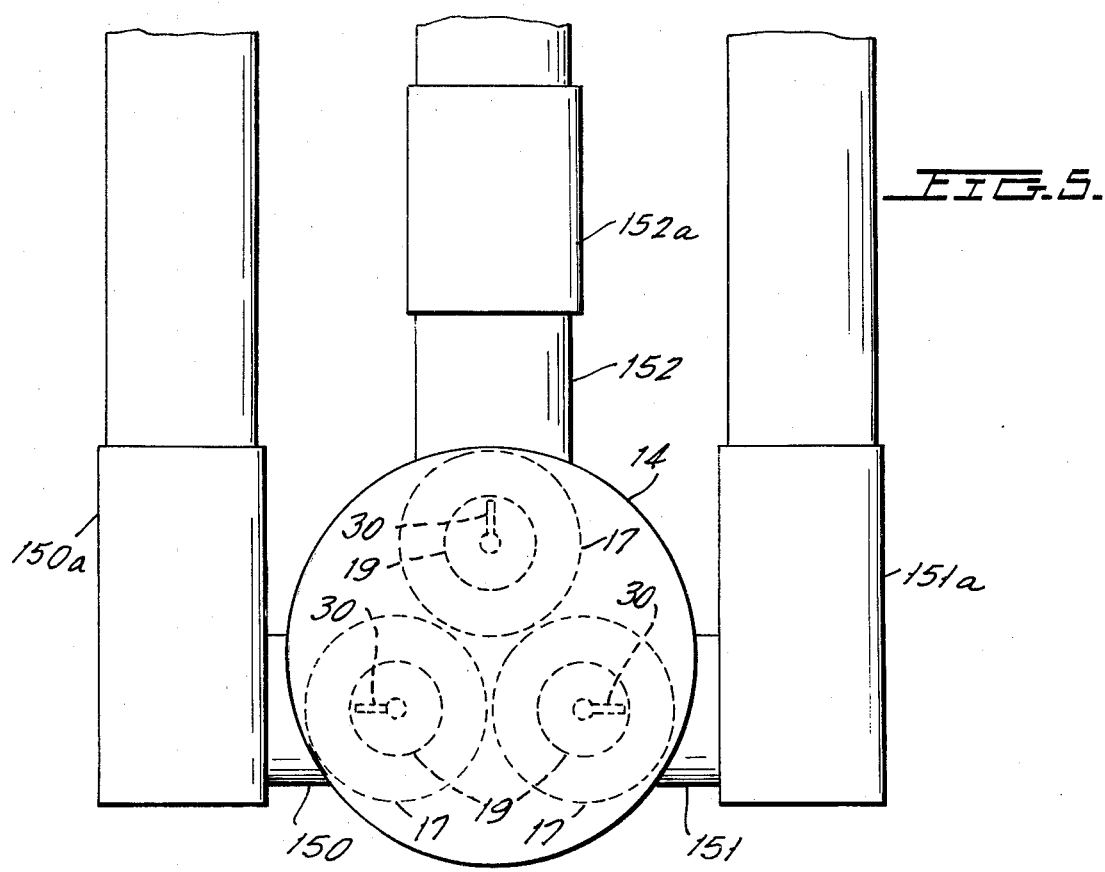
FIG. 5 is a structure corresponding substantially to that of FIG. 4 showing another method of terminating the three-phase pothead into three single-phase isolated bussed assemblies.

In FIG. 5 a further alternate arrangement has been shown in which the enclosure 14 of the pothead is connected to tubular enclosures 150, 151 and 152 which, as in the case of the FIG. 4 structure, carry appropriate isolated phase bus conductors, not shown, in an $SF_6$ insulating gas through appropriate switches or interrupters 150a, 151a and 152a.

By means of the present invention, a pothead design is provided which eliminates complex devices such as trifurcation chambers, expensive underground enclosures to house them and associated cable splicing work and provides a simplified transition between the oil filled insulated cable or other insulated cable and an $SF_6$ insulated bus structure transformer connector structure or isolated phase bus structure.

In the foregoing the present invention has been described in connection only with preferred illustrative embodiments thereof. Since many variations and modifications of the present invention will now be apparent to those skilled in the art, it is preferred that the scope of this invention be defined not by the specific disclosures herein set forth, but only by the appended claims.

What is claimed is:

1. A multi-phase cable termination structure for a metal enclosed compressed gas insulated substation, comprising:
   a first and second chamber,
   a multi-phase pipe-type cable introduced into said first chamber, said first chamber including a flared housing portion to permit spreading of said cable to wider spacing,
   a terminal member on each phase conductor of said multi-phase cable;
   said second chamber containing compressed gas,
   said second chamber being located adjacent said first chamber,
   a gas tight seal between said first and second chamber,
   said terminal members each extending from said first chamber through said gas tight seal into said second chamber,
   and a plurality of tubular members extending from said second chamber;
   a single phase conductor in each said tubular member;
   and an electrical connection from each said terminal member to each said conductor;
   said terminal member being sealed at the point of passage thereof through said gastight seal,
   each tubular member communicating with said second chamber and being filled with the same type of compressed gas used in said second chamber,
   each of said single phase conductors electrically insulated from its respective said tubular member by said compressed gas.

2. The multi-phase cable termination structure of claim 1 wherein
   a insulating tube adjacent an end of said first chamber opposite from said second chamber,
   the phase conductors extending from said multi-phase cable through said insulating tube to said first chamber.

3. The multi-phase cable termination structure of claim 2 wherein
   stress relief members individual to each said terminal member,
   said stress relief member being mounted on said gas tight seal.

4. The multi-phase cable termination structure of claim 3 wherein an insulating fluid, other than the compressed gas insulating fluid of said second chamber, is provided in said first chamber and said multi-phase cable.

* * * * *